United States Patent [19]

Wiens

[11] Patent Number: 4,874,134

[45] Date of Patent: Oct. 17, 1989

[54] SOLID WASTE PROCESSING FACILITY AND PROCESS

[76] Inventor: Thomas J. Wiens, 455 Westwood, Denver, Colo. 80206

[21] Appl. No.: 220,791

[22] Filed: Jul. 18, 1988

[51] Int. Cl.$^4$ ............................................. B02C 21/00
[52] U.S. Cl. .......................................... 241/19; 71/14; 71/64.04; 241/24; 241/25; 241/79.1; 241/101.2; 241/DIG. 38
[58] Field of Search ........ 241/101.2, 19, 20, DIG. 38, 241/80, 97, 24, 79.1, 77, 25; 71/9, 12, 13, 14, 64.04, 64.03

[56] References Cited

U.S. PATENT DOCUMENTS

| | | |
|---|---|---|
| 3,524,594 | 8/1970 | Anderson et al. . |
| 3,557,685 | 12/1968 | Schroering . |
| 3,738,483 | 6/1973 | MacKenzie . |
| 3,741,863 | 6/1973 | Brooks . |
| 3,897,215 | 7/1975 | Davidson et al. ...... 241/DIG. 38 X |
| 3,925,198 | 12/1975 | Eckhoff et al. . |
| 4,065,282 | 12/1977 | Morey . |
| 4,077,847 | 3/1978 | Choi et al. . |
| 4,187,775 | 2/1980 | Flender . |
| 4,264,352 | 4/1981 | Houser . |
| 4,341,353 | 7/1982 | Hamilton et al. . |
| 4,460,131 | 7/1984 | Cerroni . |
| 4,553,977 | 11/1985 | Fry . |

FOREIGN PATENT DOCUMENTS 8401119 11/1985 Netherlands .

Primary Examiner—Mark Rosenbaum
Attorney, Agent, or Firm—Bachman & LaPointe

[57] ABSTRACT

The present invention relates to a process and a facility for treating solid waste to recover recyclable materials and to form a compost from a biodegradable fraction within the solid waste. The process and facility lend themselves to efficiently recovering useful materials such as corrugated paper, ferrous metals, non-ferrous metals, plastic products, paper, and other redeemables such as glass containers. Various process steps are employed to recover these materials.

23 Claims, 3 Drawing Sheets

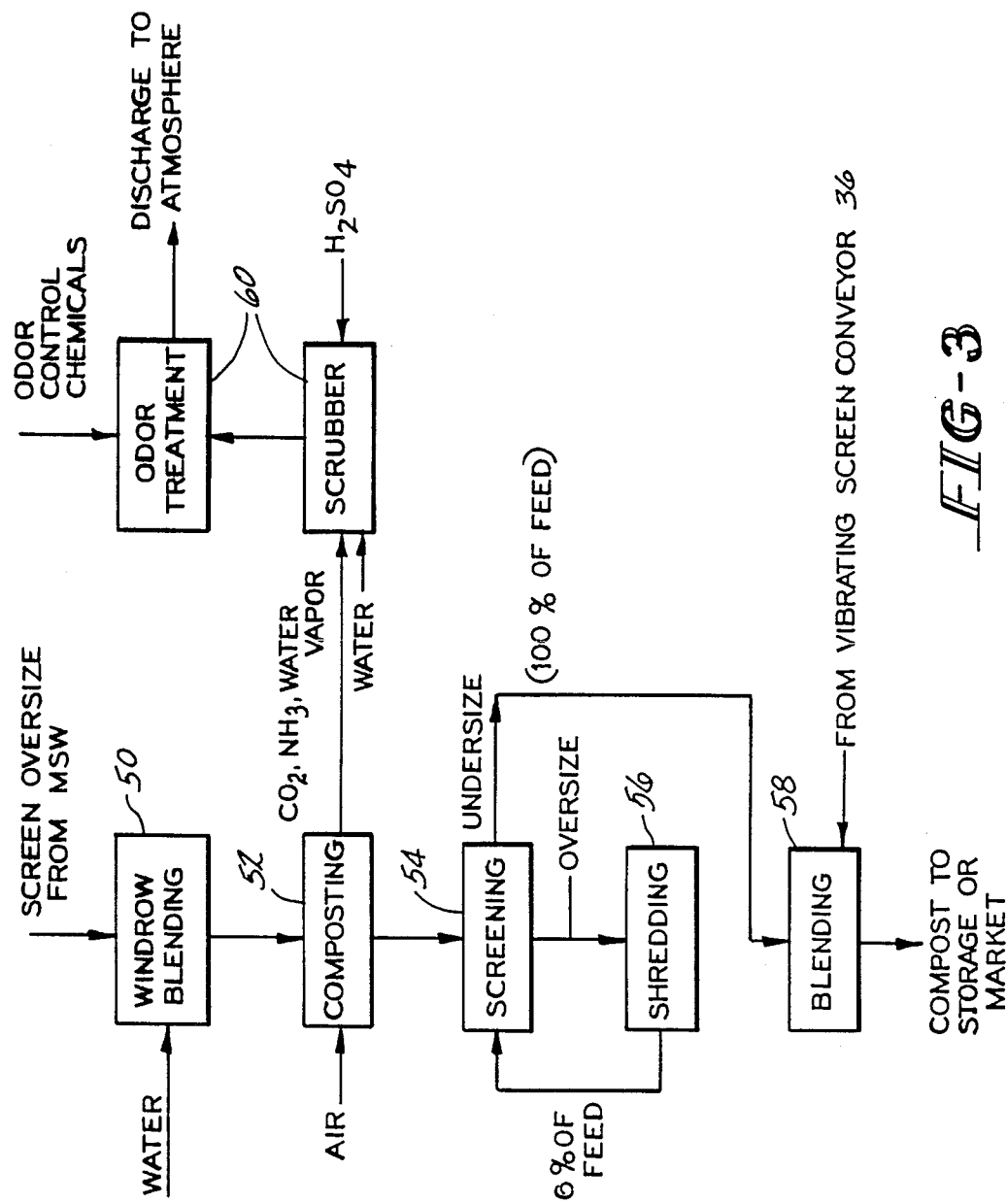

SOLID WASTE PROCESSING FACILITY AND PROCESS

BACKGROUND OF THE INVENTION

The present invention relates to a process and a facility for treating solid waste materials to separate out and recover usable materials and for forming a commercial compost from a recoverable biodegradable waste material fraction.

Solid waste materials such as household garbage and commercial trash from retail establishments, apartments, offices and warehouses have traditionally presented problems of disposal. These problems have become increasingly critical in recent years as a result of a rapidly increasing population and a dramatic increase in the per capita production of solid waste. Additional disposal problems have been created by the change in character or composition of municipal waste as a result of the movement away from metal, wood and glass packaging toward paper and plastic packaging.

Currently solid waste is disposed of by incineration and/or land fill. Incineration is rapidly becoming a non-viable alternative in heavily populated areas. The public outcries against air pollution from the burning of waste materials has halted nearly all new incinerator construction. Similar problems surround new landfills. Environmental restrictions as well as land usage demands for housing have reduced the number of sites available for landfills.

In response to these waste disposal problems, both the government and the public have demanded that wherever possible recycling be employed both to conserve material resources and to reduce pollution problems. Efforts have been made to recover valuable resources such as glass, plastic, paper, aluminum and ferrous metals from waste materials. A variety of systems and techniques for recovering these resources from solid waste materials have been developed. U.S. Pat. Nos. 3,738,483 to MacKenzie, 3,925,198 to Eckhoff et al., 4,077,847 to Choi et al., 4,187,775 to Flender, 4,341,353 to Hamilton et al., and 4,553,977 to Fry as well as Netherlands Patent No. 8401119 illustrate some of the known systems for separating and recovering recyclable materials contained in municipal and/or industrial waste.

While most systems are designed to recover as many recyclable materials as possible, some are designed to recover specific materials and/or form specific products. U.S. Pat. Nos. 3,557,685 to Schoering, 3,741,863 to Brooks, and 4,460,131 to Cerroni for example illustrate systems and processes for recovering paper products, cardboard and/or other types of waste cellulosic materials. U.S. Pat. No. 4,065,282 to Morey illustrates a method for recovering glass from municipal waste.

Some systems take a recovered fraction and process it into fuel or some other useful product. U.S. Pat. No. 3,524,594 to Anderson et al. for example transfers a remaining refuse portion containing organic waste to digester tanks for composting. U.S. Pat. No. 4,264,352 to Houser illustrates a system for separating out various waste material fractions and for converting a recovered wetted paper fraction into a compost.

The components in each of these systems are specifically arranged and designed to recover certain individual fractions such as combustible organic materials, aluminum, ferrous metals, glass plastic, and miscellaneous bulky inorganic material. Efficient resource recovery depends upon separating the maximum amount of desirable material from the refuse using relatively few separating components. It also depends upon minimizing the percentage of unwanted materials in the individual fractions.

Accordingly, it is an object of the present invention to provide an economically viable, efficient process for treating solid waste material to separate out and recover recyclable materials.

It is a further object of the present invention to provide a process as above for forming a commercially useful compost from biodegradable waste products and other useful inert materials recovered from the treated waste material.

It is yet another object of the present invention to provide a zero discharge facility for performing the above process.

It is still another object of the present invention to provide a process and a facility as above which have a minimal environmental impact.

These and other objects and advantages will become more apparent from the following description and drawings.

SUMMARY OF THE INVENTION

The foregoing objects and advantages are obtained by the process and the facility of the present invention. The process for treating solid waste materials and for forming a compost from a biodegradable waste material fraction therein comprises the steps of: receiving untreated solid waste material at a receiving station; manually removing bulky valuables, non-processable materials and redeemable materials from the untreated waste material; magnetically separating a first ferrous metal fraction from the waste material; comminuting or shredding the waste material after separating out the first ferrous metal fraction; magnetically separating a second ferrous metal fraction from the comminuted waste material; pneumatically separating a paper fraction from the comminuted waste material leaving a substantially biodegradable fraction; and forming a compost from the biodegradable fraction. The materials removed and recovered during the manual operation steps include corrugated paperboard, non-ferrous metals, glass containers and plastic products such as light plastic bags and plastic bottles. The process also includes removal of a fine debris fraction including dust, glass, grass and leaves from the comminuted material before separating the paper fraction. The separated fine debris is later remixed with the biodegradable fraction during composting process.

The compost forming step of the process comprises: applying water to the biodegradable fraction to form a compostable material having an adjusted solids content of about 40%; placing the material into windrows; fluffing and aerating the material in the windrows; and adjusting the temperature of the compost material to a temperature in the range of from about 55° C. to about 65° C. and maintaining the temperature for at least three days. Thereafter, the compost material is screened, shredded and blended with a portion of the fine debris fraction or other material and/or nutrients to form the commercial compost product.

The facility for performing the process of the present invention includes a first building having one or more treatment lines for separating out the various recoverable products. Each treatment line includes a first station for receiving untreated waste material and for manually removing bulky valuables and non-processable materials from the untreated waste material, a second station for manually removing redeemable plastic materials and non-ferrous metal materials from the waste material, a third station having means for magnetically separating a first ferrous metal fraction from the waste material, means for comminuting the waste material after separating out the first ferrous metal fraction, means for magnetically separating a second ferrous metal fraction from the comminuted waste material, a fourth station having means for pneumatically separating a paper fraction from the comminuted waste material leaving a substantially biodegradable fraction, and means for transferring the biodegradable fraction to a means for forming a compost from the biodegradable fraction. In a preferred embodiment, a vibrating screen conveyor for removing a fine debris fraction is positioned between the second ferrous metal fraction separating means and the pneumatic paper fraction separating means. Each treatment line further includes means for deodorizing and dedusting the air used to separate the paper fraction. In a preferred embodiment, the compost forming means is substantially located in a second building separate from the first building.

One of the primary advantages of the facility of the present invention is that it is a zero discharge facility. There is no effluent stream leaving the facility. There also are no water or air pollutants leaving the facility. Substantially all materials brought into the facility are recovered.

BRIEF DESCRIPTION OF THE DRAWINGS

FIG. 3 is a flow chart showing the process for converting the biodegradable fraction recovered from the waste material into a compost material.

DETAILED DESCRIPTION

Table I represents an adjusted national average composition for solid municipal waste as determined by the Environmental Protection Agency. Adjustments have been made to allow for recent ordinances which affect the contents of beverage glass, plastic bottles and cans, most of which are now redeemed for their five cent deposit valve.

TABLE I

PROJECTED AVERAGE WASTE COMPOSITION AND FEED RATE

| COMPONENT | TPH | PERCENT BY WT. |
| --- | --- | --- |
| Moisture | 6.50 | 26 |
| Inorganic (Ash, stones, dirt fines) | 0.50 | 2 |
| Organics (Yard waste, garbage, leaves) | 5.61 | 22.45 |
| Paper (Magazines, packaging, etc.) | 4.00 | 16 |
| Newsprint | 1.00 | 4 |
| Corrugated | 1.75 | 7 |
| Plastic, Rubber | 1.00 | 4 |
| Textiles | 0.25 | 1 |
| Wood | 0.75 | 3 |
| Glass | 1.70 | 6.8 |
| Metal | 1.90 | 7.6 |
| Aluminum | 0.04 | 0.15 |
| TOTAL | 25.00 | 100 |

The process and facility of the present invention are designed to accept municipal solid waste such as that shown in Table I including brush, trees and stumps and to process the waste at a rate of about 25 tons per hour. Materials exempted from treatment are hazardous waste, tool steels, reinforced concrete, white goods such as refrigerators, washers, driers, ranges and the like, automobile scrap metal, materials larger than 47" wide and/or 48" high, flammables or explosives such as paint, gasoline, propane bottles, and dynamite, and infectious waste. The present process and facility recover corrugated paper, plastics, redeemables, non-ferrous metals, magnetic metals and baled paper as well as form a compost from the remainder of the process residue which primarily consists of biodegradable materials and inert materials.

Figure 1:
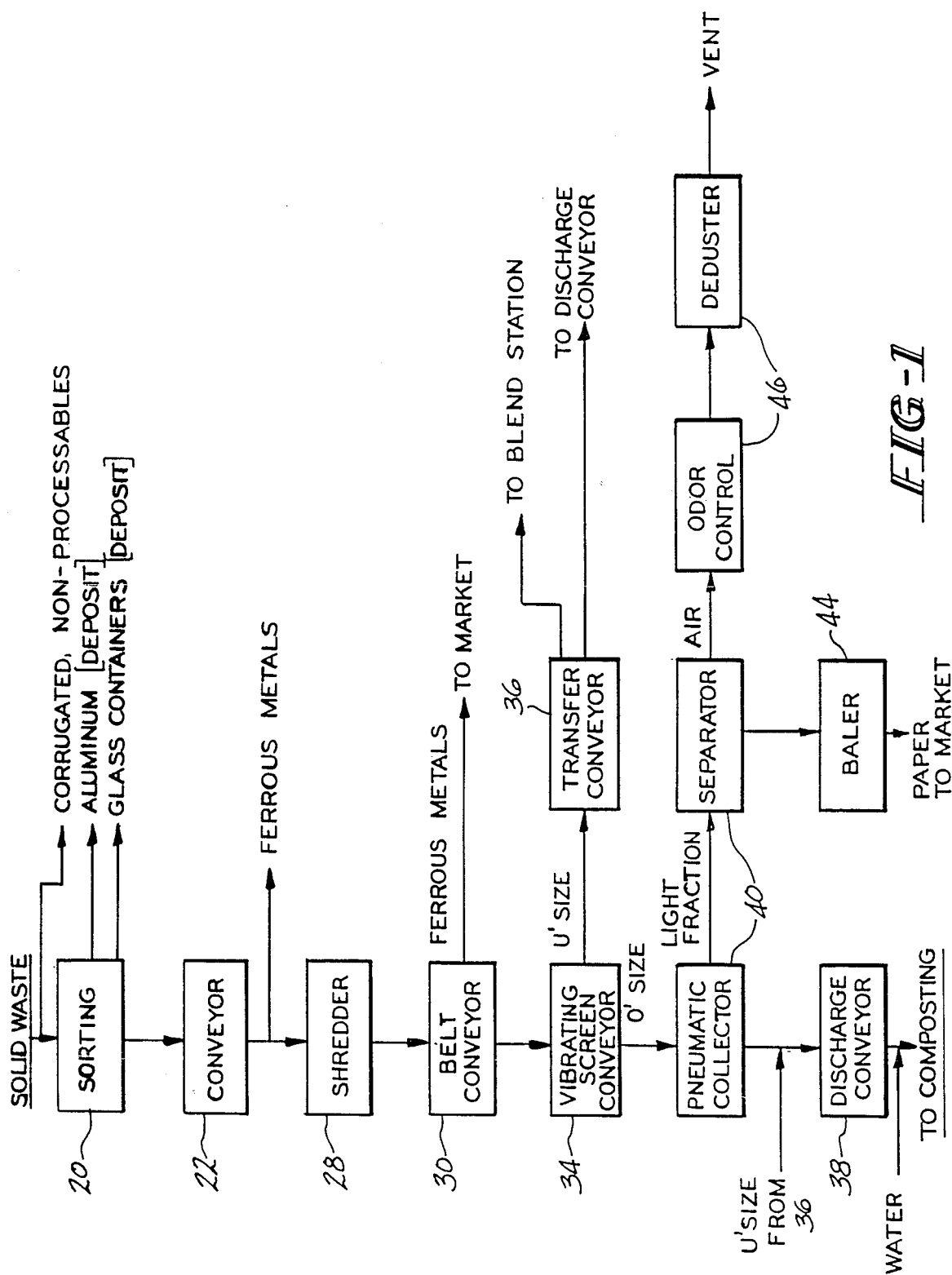
FIG. 1 is a flow chart showing the broad process for treating solid waste material.
Figure 2:
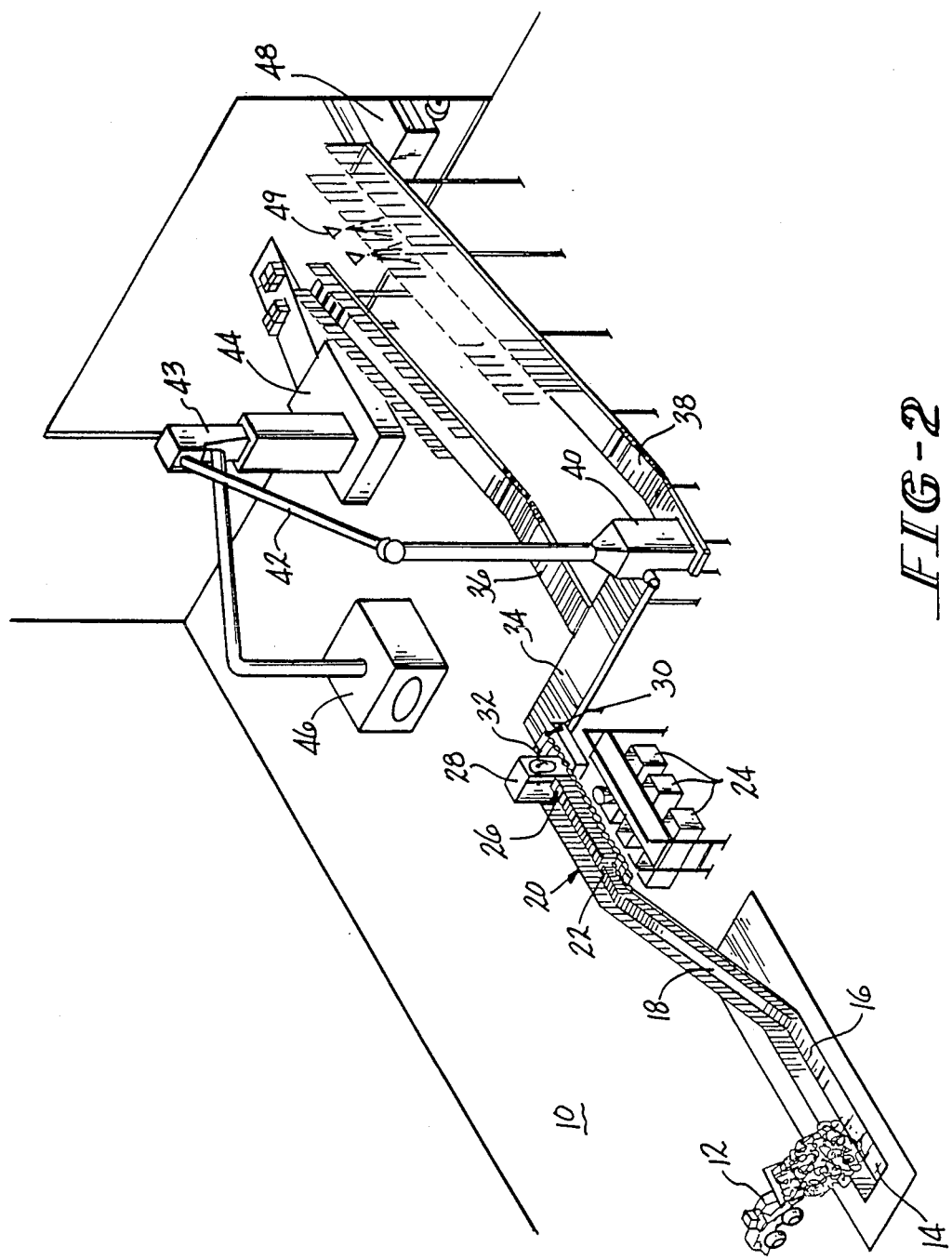
FIG. 2 is a schematic representation of a treatment line in accordance with the present invention.

Referring now to the figures, the process employed in the present invention is broadly outlined in FIG. 1. Incoming truckloads of untreated municipal solid waste are initially weighed and ticketed at a scale house and assigned a dump area by the scale operator. The trucks discharge their waste onto a tipping floor 10 which forms a receiving station. Sorters on the floor open any bags or boxes and remove non-processables and bulky valuables. The sorters also scavenge items of high economic value such as corrugated paperboard for recycling.

A front end loader 12 pushes the waste into a shredder feed conveyor pit 14 located on the side of the floor 10 which is not receiving waste. The waste is then fed along conveyors 16 and 18 until it reaches a second station 20. At the second station, the waste material moves along a conveyor 22. Sorters at the second station manually remove plastic products such as light plastic bags and plastic bottles, redeemables such as glass containers, non-ferrous metals such as aluminum cans, and batteries as the material moves along the conveyor 22.

If desired, an eddy current separator not shown may be used to remove aluminum from the material processed. When used, it is desirable to position the eddy current separator at the beginning of conveyor 22.

The items removed by the sorters and/or the eddy current separator may be collected in a series of bins 24. These removed materials may be further processed if desired. For example, each removed product may pass through a shredder not shown or some other piece of processing equipment not shown before dropping into its respective bin 24.

A magnetic head pulley 26 located at the exit end of the conveyor 22 removes a first ferrous metal fraction which includes cans and steel products from the waste material and deposits it into one of the bins 24. If desired, the removed ferrous metal may be processed, i.e. shredded, before entering the bin 24. The magnetic head pulley 26 used to remove the ferrous metal fraction may comprise any suitable magnetic head pulley known in the art.

The remaining waste material is fed by the conveyor 22 into a shredder 28 which reduces the waste material to a desired size such as to about a minus 3" to about a minus 4" material. The shredder 28 may comprise any suitable shredder or comminution device known in the art. As the shredded or comminuted waste material leaves the shredder, it is discharged onto a belt conveyor 30. A second magnetic head pulley 32 on the discharge conveyor 30 removes a second ferrous metal fraction. Ideally, the pulley 32 removes remaining ferrous material such as nails, batteries and mattress springs from the waste material being discharged onto the conveyor 30. As before, the pulley 32 removing the second ferrous metal fraction may comprise any suitable magnetic head pulley known in the art.

The non-magnetic discharge from the conveyor 30 is then transferred to a vibrating screen conveyor 34 which is used to remove fine debris under a particular size. This fine debris may include dust, ground glass, grass and leaves. The undersized fine debris is removed by a conveyor 36 which transports it to a station 58 for use in the composting process and/or to a discharge conveyor 38.

The remaining waste or screen oversize continues on and waterfalls or drops off of the vibrating screen conveyor 34 onto a composting conveyor 38. As the waste material drops, typically a distance of about four feet, it momentarily becomes suspended in air. During this period, it enters a pneumatic collector and separator 40 which separates out a paper fraction. If any light plastics such as garbage bags and bread wrappers remain in the shredded waste material, the separator 40 will remove them as well as the paper. The paper and any light plastic material travel along a jet of air in conduit 42 to a conduit 43 where no air flows. At this conduit, the paper and any light plastic material drop to a recovery station which includes a baler 44. The paper is then baled for recycling. The pneumatic separator 40 and the baler 44, respectively, may comprise any suitable pneumatic separator and baler known in the art.

Ventilation of the process building housing the treatment line(s) is done by pulling outside air through the pneumatic separator 40. The air which is used to transport the paper is treated to remove any odors and dust. An odor removal chemical is applied to the air in the ducting 42 using a spray device not shown. Thereafter, the air passes through a separator 46 having a combination odor and dust filter before being vented either to the interior or the exterior of the building housing the treatment line(s).

After removal of the paper fraction, the remaining material, which substantially consists of biodegradable material, is transferred by conveyer 38 to an outside trailer 48 for transfer to the composting area. In a preferred embodiment, the composting area is housed in a building 50 separate from that housing the treatment line(s).

While the material is transported along conveyor 38 to the trailer 48, it may be sprayed with water. Any suitable means 49 known in the art such as spray nozzles may be used to spray the material. The purpose of the water spray is to adjust the solids content of the material traveling along conveyor 38 to about 40 percent. In cold periods, warm water may be sprayed onto the material to add to its heat content. If desired a portion of the fine debris can be added to the remaining material before application of the water.

If desired, the water spray means 49 may be omitted. In such an instance, the solids content of the material is adjusted after the material reaches the compost building. The compost building may have conventional water spray devices 51 for adding the desired amount of water. Alternatively, both spray means 49 and spray devices 51 may be used to adjust the solids content of the material entering the building 50.

A floor vacuum not shown may be provided to clean the tipping floor 10 as necessary to minimize dusting. Daily tipping floor washdown is recommended to prevent the accumulation of rotting waste on the recovery system floor. Wash water used to clean the floor 10 can be collected in floor sumps not shown if desired for transfer to the compost building and use in the composting process.

The substantially biodegradable material transported to the compost building is composted via bio-oxidation. The composting process is broadly shown in FIG. 3. Preferably, composting is carried out in a building separate from the building in which the materials are separated out. Inorganic material such as glass and large organic material particles such as wood chips may be used in the process as a bulking material along with other components of the processed waste. Bio-oxidation is preferred because it is a relatively simple process to perform.

Bio-oxidation produces heat in its consumption of the organic matter. This heat is conducted by the moisture in the compost pile, and serves to destroy pathogen microorganisms and weed seeds residing in the remaining waste. These pathogens, e.g., Salmonella, are essentially destroyed if the temperature of the composting mass reaches about 65° C. and remains at that level for at least two days. The Environmental Protection Agency recommends a level of about 55° C. for at least three days. The composting system, as designed, raises or adjusts all composted materials to the desired minimum temperature of about 55° C. over a period of time, generally from one to eight weeks. Once the material has reached the desired temperature, it is kept at at least that temperature for a period of at least 3 days. Preferably, the material is maintained at a temperature in the range of from about 55° C. to about 65° C. for at least three days.

These temperature conditions are produced and maintained by first forming the compost into windrows 52 and adjusting the material to about forty percent solids by adding water at a blending station 50 via spray devices 51. Thereafter, the compost material in the windrow is processed preferably with a "Scarab" type machine not shown which straddles the pile and fluffs and aerates the material. The Scarab machine includes a rotating drum which flails the compost material as it traverses the length of the windrow.

While pathogens are destroyed early in the composting process the bio-oxidation process must continue in order to decompose the bulk of the organic matter and evaporate moisture in the compost piles to attain a sixty-percent solids product. The resulting dried product prevents the reestablishment of pathogen populations. Composting is preferably carried out for a period of three to eight weeks with pile temperatures maintained as previously reported at 55° C.–65° C. for at least three days. Moisture is reduced forty- to fifty-percent during the cycle. After composting, any remaining pathogen populations are exposed to the homeostatic properties of the soil and to competition with existing soil microorganisms when used as a soil amendment. The result is a further reduction in pathogens.

After completion of the composting cycle the material is collected from the windrows by front end loaders not shown and placed in a bin for feeding to a trommel screen 54. The material is conveyed and distributed into a brushed trommel screen 54. Preferably, the screen 54 passes minus ⅜" materials. The minus ⅜" compost or undersize is conveyed and discharged to an outside storage pile for curing via a blending station 58. A front end loader not shown places the screened compost in outside curing/storage piles for marketing. Any trommel screen oversize approximately 6% of the feed is conveyed to a shredder 56. In the shredder, the material is reduced to minus ⅛". The shredder discharge is recycled to the trommel screen feed bin. When screened the minus ⅜" fraction blends with the minus ⅜" finished compost while the plus ⅜" fraction returns to the shredder.

Since the compost is totally derived from municipal solid waste the appearance may affect marketability. Blending with soils or fine debris from the treatment line at station 58 may be necessary to match the use with the product quality. Because of the seasonal demand for compost, a three acre five month outdoor storage area is desirable.

The compost thus produced can be used as a soil amendment for landfill reclamation, construction sites, golf courses, flower potting and nurseries. If desired industrially pre-treated sewage sludge may be added to the windrows 52 during the composting process. The sewage sludge if used should be first tested for uncompostable materials.

During composting, some carbon dioxide and ammonia are produced. Because of this, the compost building is preferably force-ventilated. Provisions 60 are preferably made for scrubbing the exhaust air to control and remove odors and unwanted gases. These provisions may include a scrubber and an odor treatment system.

If there is more than one waste material treatment line, the facility may be run in alternative fashions depending on the maximum economic value that can be derived from the feed stock. For example, during operation it may become apparent that certain trucks will dump high percentages of corrugated material. These can be collected and campaigned so that the higher value corrugated product can then be recovered and baled. Additionally, when trees and brush are treated they can be campaigned without operating the pneumatic paper conveying system. Then the wood chips can be collected for use as a bulking agent in the compost or collected and marketed separately.

Alternatively, one treatment line may be used in the standard manner described above, while a second line is used to treat particular segregated or campaigned materials such as trees, different types of paper or corrugated cardboard. It has been found that by doing this, one is able to get higher quality recycles. When particular materials are being treated, various components of the line may be shut down. For example, when treating only trees or brush, the ferrous metal separators can be shut off.

As can be seen from the foregoing discussion, an efficient waste material recycling process and facility have been described. The facility can be appropriately termed a zero discharge facility. Substantially all incoming materials are recovered and recycled. In addition, the process and the facility recover a maximum amount of useful recyclable material using a relatively few number of steps and separating components. Besides being efficient, the process and facility present significant economic benefits. In addition to recovering useful resources, the process and facility produce a commercially salable compost product. From an environmental standpoint, the process and facility of the present invention have a minimal impact. There is no burning of materials which leads to air pollution nor preparation of materials to be burned. There is a minimal amount of material which needs to be transported to a landfill, thus reducing the impact on landfill sites reaching their capacity.

It is apparent that there has been provided in accordance with this invention a solid waste processing facility and process which fully satisfies the objects, means, and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A process for treating solid waste materials and forming a compost from a biodegradable waste material fraction, said process comprising:
   receiving untreated solid waste material at a receiving station;
   manually removing bulky valuables, non-processable materials and redeemable materials from said untreated waste material;
   said removing step including manually removing plastic and non-ferrous materials;
   magnetically separating a first ferrous metal fraction from said waste material;
   comminuting said waste material after separating out said first ferrous metal fraction;
   magnetically separating a second ferrous metal fraction from said comminuted waste material;
   pneumatically separating a paper fraction in a dry state from said comminuted waste material leaving a substantially biodegradable fraction; and
   forming a compost from said substantially biodegradable fraction.

2. A process according to claim 1 wherein:
   said receiving step comprises dumping said untreated solid waste material on a tipping floor; and
   said removing step comprises manually removing non-processable materials and corrugated paperboard from said material on said floor.

3. A process according to claim 2 which further comprises pushing said waste material less said non-processable materials and corrugated paperboard onto a belt conveyor and wherein said removing step further comprises manually removing other redeemables.

4. A process according to claim 3 wherein said first ferrous metal fraction separating step comprises providing a feed conveyor having a magnetic head pulley adjacent one end and removing cans, steel articles and other ferrous metal articles from said waste material with said pulley.

5. A process according to claim 4 wherein said comminuting step comprises shredding said waste material to a minus 3" to a minus 4" material.

6. A process according to claim 5 wherein said second ferrous metal fraction removing step comprises providing a discharge conveyor for receiving said shredded waste material, providing a second magnetic head pulley on said discharge conveyor, and removing said second ferrous metal fraction from said shredded waste material with said second magnetic head pulley.

7. A process according to claim 1 which further comprises providing a vibrating screen conveyor and removing a fine debris fraction including dust, glass, grass and leaves with said vibrating screen conveyor after said second ferrous metal removing step and before said paper separation step.

8. A process according to claim 1 which further comprises baling said separated paper fraction.

9. A process according to claim 1 wherein said compost forming step comprises applying water to said biodegradable fraction to adjust the solids content to about 40% and forming said compost by bio-oxidation.

10. A process according to claim 9 which further comprises mixing said biodegradable fraction with at least a portion of said fine debris fraction prior to said water applying step.

11. A process according to claim 1 wherein said compost forming step comprises: placing said bio-degradable fraction into compost material windrows adjusted to about 40% solids content; providing means for fluffing and aerating said compost material in said windrows by flailing said compost material as said fluffing and aerating means traverses the length of each windrow; and adjusting said compost material in said windrow to a temperature in the range of from about 55° C. to about 65° C. and maintaining said temperature for at least three days.

12. A process according to claim 11 which further comprises: removing said compost material from said windrows; passing said compost material through a brushed trommel screen which passes minus ⅜" materials; curing said screened compost material; conveying oversized compost material from said trommel screen to a shredder; and recycling said shredded compost material to said trommel screen.

13. A process according to claim 12 which further comprises blending a portion of the fine debris fraction with said screened compost material.

14. A facility for treating solid waste materials and forming a compost from a biodegradable waste material fraction, said facility comprising:
a first building in which said biodegradable waste material is separated from said solid waste materials; and
said first building including at least one treatment line having a first station for receiving untreated solid waste material and for manually removing bulky valuables and non-processable materials from said untreated waste material, a second station for manually removing redeemable plastic and non-ferrous metal materials from said waste material, a third station having means for magnetically separating a first ferrous metal fraction from said waste material, means for comminuting said waste material after separating out said first ferrous metal fraction, means for magnetically separating a second ferrous metal fraction from said comminuted waste material, a fourth station having means for pneumatically separating a paper fraction from said comminuted waste material leaving a substantially biodegradable fraction, and means for transferring said substantially biodegradable fraction from said first building to a site whereat said compost is formed.

15. A facility according to claim 14 wherein said at least one treatment line further has a feed conveyor between said second station and said comminuting means and said first ferrous metal fraction separating means comprises a magnetic head pulley positioned adjacent an end of said feed conveyor.

16. A facility according to claim 14 wherein:
said comminuting means comprises a shredder;
said at least one treatment line further has a discharge conveyor for receiving comminuted material from said shredder; and
said second ferrous metal fraction separating means comprises a magnetic head pulley adjacent said discharge conveyor.

17. A facility according to claim 14 wherein said at least one treatment line further has a vibrating screen conveyor for removing fine debris including dust, glass, grass and leaves from said comminuted waste material, said vibrating screen conveyor being positioned intermediate said second ferrous metal fraction separating means and said fourth station.

18. A facility according to claim 14 wherein said at least one treatment line further includes means for baling said paper fraction and means communicating with said pneumatic separating means for deodorizing and removing dust from an air stream used by said pneumatic separating means, whereby said deodorized and dedusted air is used to ventilate the building.

19. A facility according to claim 14 wherein said first building has a plurality of waste treatment lines.

20. A facility according to claim 14 which further comprises a second building in which said biodegradable waste material fraction is formed into said compost, said second building being physically separate from said first building.

21. A facility according to claim 20 wherein each said treatment line has means for applying water to said biodegradable waste material fraction to adjust its solids content to about 40% and means for mixing at least a portion of a fine debris fraction with said biodegradable waste material fraction.

22. A facility according to claim 20 wherein said biodegradable waste material fraction is placed into windrows in said second building and said facility includes means for fluffing and aerating said material in said windrows and means for adjusting the temperature of said material in said windrows to a temperature in the range of from about 55° C. to about 65° C. and for maintaining said temperature for at least three days.

23. A facility according to claim 22 which further includes a brushed trommel screen, means for feeding compost material from said windrows through said screen, means for conveying an oversized compost material fraction to a shredder; and means for returning shredded oversized compost material to said feeding means.

* * * * *